(12) United States Patent
Luecke et al.

(10) Patent No.: US 7,874,331 B2
(45) Date of Patent: Jan. 25, 2011

(54) PNEUMATIC TIRE WITH TREAD HAVING CHAMFER LOCATED IN NOTCH

(75) Inventors: Eric Matthew Luecke, Doylestown, OH (US); Delwyn Lovell Harvey, North Canton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 838 days.

(21) Appl. No.: 11/803,359

(22) Filed: May 14, 2007

(65) Prior Publication Data

US 2008/0210356 A1 Sep. 4, 2008

Related U.S. Application Data

(60) Provisional application No. 60/904,733, filed on Mar. 2, 2007.

(51) Int. Cl.
*B60C 11/03* (2006.01)
*B60C 11/12* (2006.01)

(52) U.S. Cl. .................. 152/209.15; 152/209.21; 152/209.24; 152/DIG. 3

(58) Field of Classification Search ............ 152/209.15, 152/209.21, 209.24, DIG. 3
See application file for complete search history.

(56) References Cited

U.S. PATENT DOCUMENTS

| | | | | | |
|---|---|---|---|---|---|
| D217,524 | S | * | 5/1970 | Parry | D12/571 |
| 5,535,798 | A | * | 7/1996 | Nakamura | 152/209.21 |
| 5,964,267 | A | * | 10/1999 | Poque et al. | 152/209.21 |
| 6,079,464 | A | * | 6/2000 | Hatakenaka et al. | 152/209.24 |
| 6,604,564 | B1 | * | 8/2003 | Thiebaud | 152/209.21 |
| 6,986,372 | B2 | * | 1/2006 | Below | 152/209.15 |
| D560,594 | S | * | 1/2008 | Brainerd et al. | D12/512 |
| 7,562,683 | B2 | * | 7/2009 | Miyazaki | 152/209.15 |
| 7,784,511 | B2 | * | 8/2010 | Harvey et al. | 152/209.8 |
| 2004/0069389 | A1 | * | 4/2004 | Ratliff, Jr. | 152/209.15 |
| 2004/0256039 | A1 | * | 12/2004 | Ratliff et al. | 152/209.24 |
| 2005/0109437 | A1 | * | 5/2005 | Shirouzu | 152/209.15 |
| 2005/0217775 | A1 | * | 10/2005 | Metz | 152/209.21 |

(Continued)

FOREIGN PATENT DOCUMENTS

EP 296605 * 12/1988

(Continued)

OTHER PUBLICATIONS

Machine translation for Japan 2001-121926 (no date).*

(Continued)

*Primary Examiner*—Steven D Maki
(74) *Attorney, Agent, or Firm*—Robert N. Lipesik

(57) ABSTRACT

The tread of a pneumatic tire has a plurality of tread elements separated by at least one groove, the tread elements having a depth as determined from an initial tread surface and the base of the at least one groove. The tread has at least one chamfer. The chamfer is divided into at least two inclined adjacent portions with the inclined adjacent portions being inclined at different inclination angles relative to the tread surface. The difference in inclination angles of the different portions is at least 10°. The inclined adjacent portions are both connected to an inclined common area, the inclined common area being adjacent to the initial tread surface.

9 Claims, 3 Drawing Sheets

U.S. PATENT DOCUMENTS

2006/0011279 A1* 1/2006 Miyasaka .............. 152/209.15
2006/0042738 A1* 3/2006 Matsumoto ............ 152/209.21

FOREIGN PATENT DOCUMENTS

| EP | 849101 | * | 6/1998 |
| EP | 1 213 160 | | 6/2002 |
| EP | 1 410 927 | | 4/2004 |
| JP | 01-215603 | * | 8/1989 |
| JP | 2918227 | * | 9/1989 |
| JP | 2001-121926 | * | 5/2001 |
| JP | 2001-225611 | * | 8/2001 |

OTHER PUBLICATIONS

Machine translation for Japan 2918227 (no date).*
Machine translation for Japan 2001-225611 (no date).*
Abstract for Japan 2918227 (no date).*
Machine translation for Europe 296605 (no date).*
European Search Report, completed Jun. 5, 2008.

* cited by examiner

US 7,874,331 B2

PNEUMATIC TIRE WITH TREAD HAVING CHAMFER LOCATED IN NOTCH

This application claims the benefit of, and incorporates by reference, U.S. Provisional Application No. 60/904,733 filed Mar. 2, 2007.

FIELD OF THE INVENTION

The present invention relates to a pneumatic tire. More particularly, the present invention is directed to a tire tread having a multi-angled chamfer.

BACKGROUND OF THE INVENTION

In a conventional pneumatic tire, particularly a high-performance tire, the tread pattern is generally formed by combining circumferential grooves extending along the circumferential direction of the tire with a plurality of grooves inclined relative to the circumferential direction. The combination of grooves forms a plurality of tread blocks along the radially outer surface of tire. If the inclined grooves do not extend completely across the equatorial plane of the tire, a central rib may be formed in the tread.

Chamfers and their surface derivatives, usually known as bevels, have been utilized primarily to aid in the protection of non-stable corners or edges of tread blocks. Traditionally, chamfers have been just small angle slices off the corner of tread blocks where a point was considered too weak to hold up to the stresses of contacting the road. Such chamfers are cut at an angle between 30° to 75° from the tread surface.

SUMMARY OF THE INVENTION

The present invention is directed to a chamfer that may be employed in any portion of the tire. The chamfer configuration is selected to provide improved water flow from the tread surface while also providing addition traction surfaces to the tread.

Disclosed herein is a pneumatic tire having a tread. The tread has a plurality of tread elements separated by at least one groove, the tread elements having a depth as determined from an initial tread surface and the base of the at least one groove. The tread has at least one chamfer. The chamfer is divided into at least two inclined adjacent portions with the inclined adjacent portions being inclined at different inclination angles relative to the tread surface. The difference in inclination angles of the different portions is at least 10°. The inclined adjacent portions are both connected to an inclined common area, the inclined common area being adjacent to the initial tread surface.

In one aspect of the invention, the inclined adjacent portions of the chamfer are inclined at angles in the range of 10° to 60° relative to the tread surface.

In another aspect of the invention, the inclined adjacent portions are separated by a groove, a sipe, or a radially extending wall.

In another aspect of the invention, each of the inclined adjacent portions of the chamfer have a radially extending end wall at a terminal end of each of the at least two inclined adjacent portions, the ends walls having a height in the range of 0 to 50% of the groove depth. In one embodiment, the end walls have the same height; in another embodiment, the end walls have different heights.

In another aspect of the invention, the inclined common area has an inclination angle relative to the tread surface equivalent to the inclination angle of at least one of the at least two inclined adjacent portions of the chamfer. In other embodiments, the inclined common area may have an inclination angle relative to the tread surface different from the inclination angles of the at least two inclined adjacent portions of the chamfer.

Disclosed herein is a pneumatic tire, the tire comprising a tread, the tread having a plurality of tread elements separated by at least one groove, the tread elements having a depth as determined from an initial tread surface and the base of the at least one groove, at least one of the tread elements comprising at least one chamfer, the chamfer being located in a notch of the tread element wherein at the tread surface, the notch comprises an inner edge, a first side edge extending from the groove to the inner edge and a second side edge extending from the groove to the inner edge, the chamfer comprising a common area and at least two adjacent portions, the common area having a surface extending from the inner edge of the notch toward the base of the groove and being inclined at an acute angle relative to the tread surface, each adjacent portion having a surface being connected to the surface of the common area and extending from the surface of the common area toward the base of the groove, the surfaces of the adjacent portions being inclined at different inclination angles relative to the tread surface, the difference in inclination angles being at least 10°, the adjacent portions being separated by a blind groove or blind sipe such that the difference in inclination angles of one edge of the blind groove or blind sipe and the other edge of the blind groove or blind sipe, respectively, is at least 10°, the notch having a first wall and a second wall such that the first wall of the notch extends radially inward from the first edge of the notch to the chamfer and the second wall of the notch extends radially inward from the second edge of the notch to the chamfer.

DEFINITIONS

The following definitions are controlling for the disclosed invention.

"Axial" and "axially" are used herein to refer to lines or directions that are parallel to the axis of rotation of the tire.

"Centerplane (CP)" means the plane perpendicular to the tire's axis of rotation and passing through the center of its tread.

"Circumferential" means lines or directions extending along the perimeter of the surface of the annular tire parallel to the Centerplane CP and perpendicular to the axial direction.

"Radial" and "radially" are used to mean directions radially toward or away from the axis of rotation of the tire.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
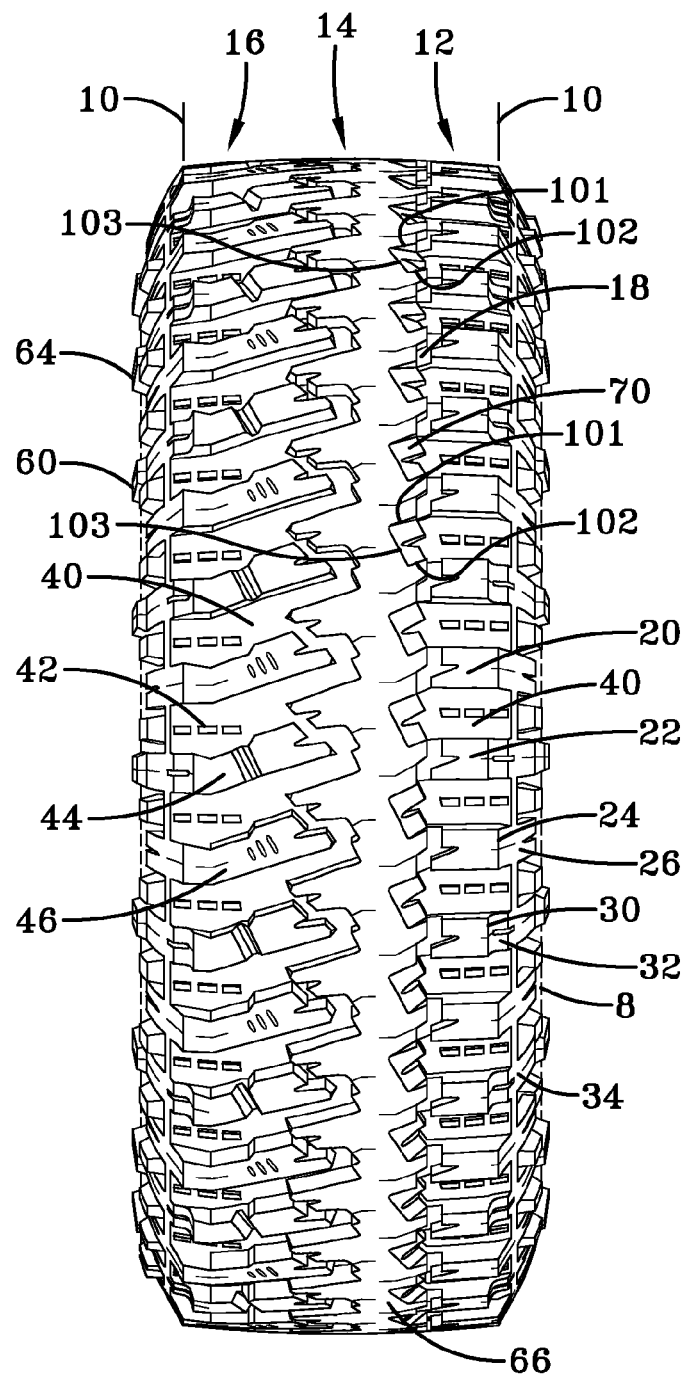
FIG. 1 is one perspective view of a tire.
Figure 2:
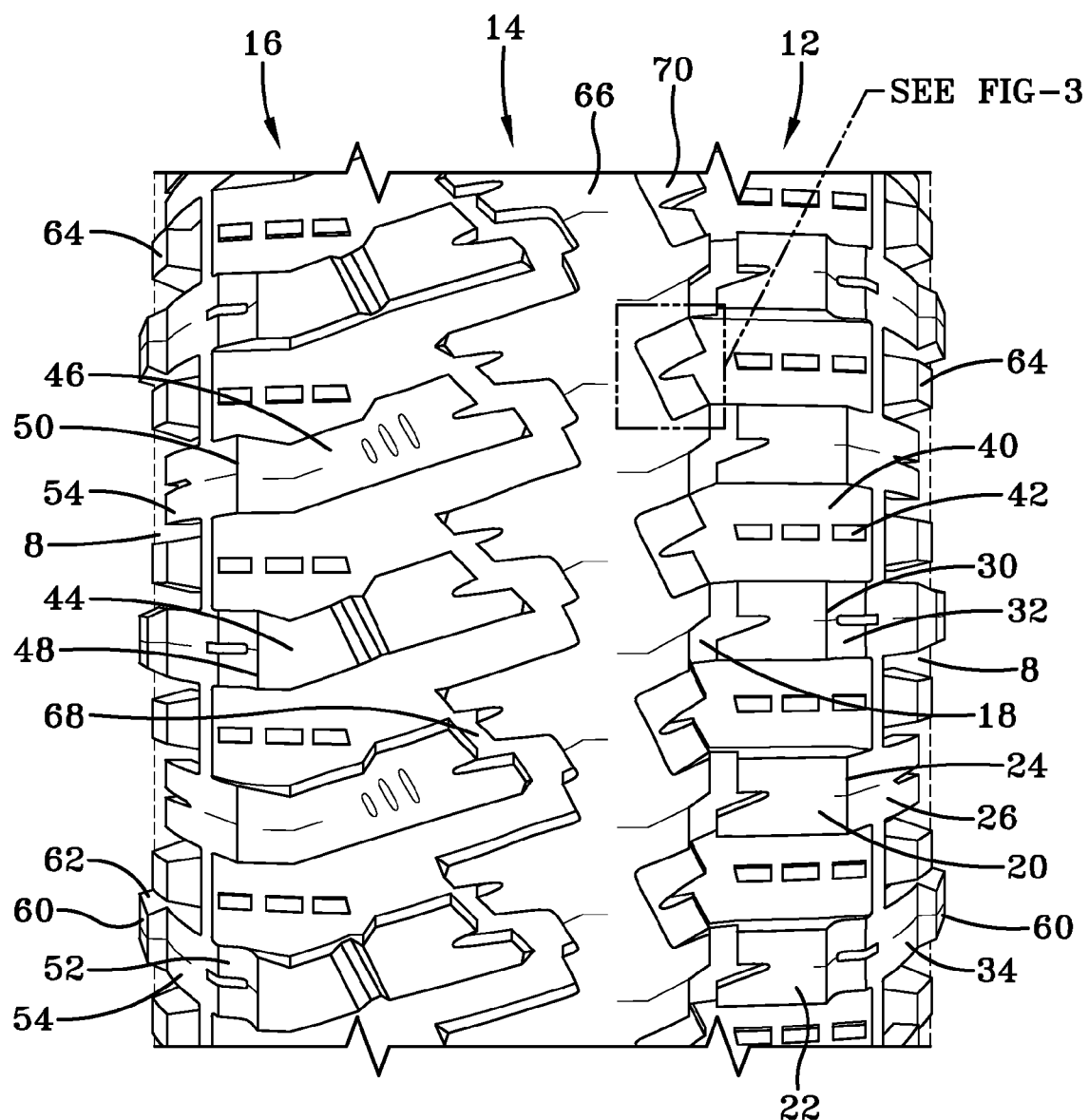
FIG. 2 is a flat view of a tread.

FIG. 1 illustrates a pneumatic tire having a tread and sidewalls 8. A flat view of a portion of the tread is illustrated in FIG. 2. The tire has an asymmetric tread located between a pair of opposing tread edges 10. The sidewalls 8 are axially outward and radially inward of the tread edges 10. The tread has a plurality of traction elements in three defined tread regions: a first edge region 12, a central region 14, and a second edge region 16. In each tread region 12, 14, 16, the traction elements are distinct from the traction elements in the other tread regions.

The first edge region 12 extends axially inward from a first tread edge. Initiating at a circumferential groove 18 are circumferentially adjacent blocks 20, 22. The overall block configuration of each block 20, 22 is similar, with the axial extent of circumferentially adjacent blocks 20, 22 alternating in a wide-narrow pattern, with the axially inner edges of the blocks aligned. The axially outer edge 24 of each wider width block 20 connects to a radially extending surface 26 that is flush, or mergers, with the tire sidewall 8. The smaller width blocks 22 have an axially outer edge 30 that is axially inward of the tread edge, and flows into a portion 32 having a radially inward curved surface; portion 32 being connected to a radially extending surface 34 flush with the sidewall 8.

Between each tread block 20, 22 is a very wide lateral groove 40. The groove 40 is inclined at an angle in the range of 45° to 90°, or 75° to 90°, relative to the tire centerplane. Within each wide lateral groove 40 is at least one stone ejection element 42. Illustrated are three laterally aligned ejection elements 42. The ejection elements 42 are centrally located within the wide groove 40 to provide protection to the base of the groove 40. Alternatively, a single, long length stone ejection element may be located in the wide groove 40.

The second edge region 16 of the tread extends axially inward from the second tread edge 10. The second edge region 16 has alternating tread blocks 44, 46 extending from the tread edge 10 to the central region 14 of the tire tread. The blocks 44, 46 are delineated by wide lateral grooves 40. The lateral grooves 40 are inclined at a low angle relative to the tire centerplane CP, and may be inclined at any angle in the range of 0° to 45° relative to the tire centerplane CP. Within the lateral groove 40 is at least one stone ejector 42.

Similar to the first tread edge 12, the axially outer edges 48, 50 of the circumferentially adjacent blocks 44, 46 in the second tread edge 16 have an alternating pattern relative to the tread edge 10 wherein every other block 44 has an axially outer edge 48 that is spaced axially inward from the tread edge 10. The blocks 44 having such a spaced axially outer edge 48 are connected to a curved portion 52 which is connected to a radially extending surface 54. The axially outer edge 50 of the other blocks 46 connect to a radially extending surface 54 which mergers with the tire sidewall 8.

Aligned with blocks 22, 44, and located axially outward of the tread edge 10 and in the tire sidewalls 8, are sidewall extension blocks 60, see also FIG. 2. The illustrated block 60 is frustum shaped, with a square base and sides 62 inclined at angles of 40° to 80° relative to the frustum base. While the block 60 has a square base, the base may have any other geometrical base configuration and the appropriate number of associated sides 62.

Aligned with the wide lateral grooves 40, and located axially outward and radially inward of the tread edge 10 and in the tire sidewall 8, is a second extension block 64. The block 64 is similar to the previously discussed sidewall extension block 60. The block 64 is a frustum, with a geometric shaped base and a number of sides corresponding to the number of sides of the block base. Because these blocks 64 are associated with each groove 40 in the illustrated tire, the blocks 60, 64 create two concentric circles of extending traction blocks 60, 64 in the sidewalls 8 of the tire.

In the central region of the tire, the tread has a continuous rib 66. One side of the rib is delineated by the circumferential groove 18. The opposite side of the rib 66 is delineated by alternating short length inclined circumferential grooves 68 and extensions of the lateral grooves 40 extending from the second shoulder region.

Figure 3:
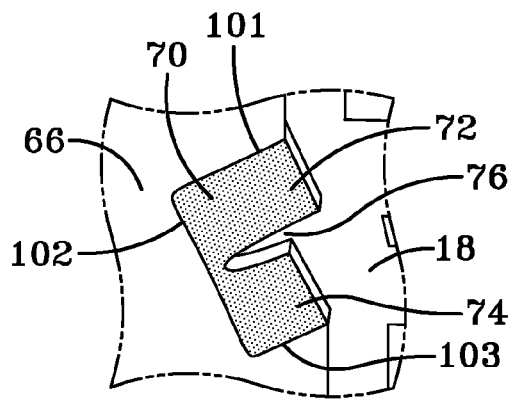
FIG. 3 is close up of a chamfer.
Figure 4:
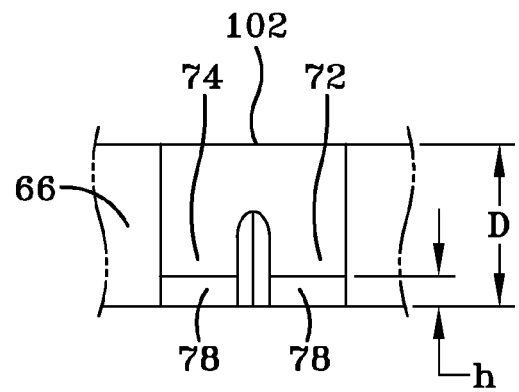
FIG. 4 is a side view of the chamfer.

Along one side of the rib 66, adjacent to the wide lateral grooves 40, in the first edge region 12, is a chamfer 70, see also FIGS. 3 and 4. The chamfer 70 begins at the initial tread surface and extends radially inward in an incline towards the base of the adjacent circumferential groove 18. The chamfer 70 is an adjacent split angle chamfer—meaning that the inclined surface of the chamfer 70 is split into two adjacent portions 72, 74 and each portion is inclined at a different angle relative to the tread surface. For the illustrated chamfer, at an approximate mid-circumferential point of the chamfer 70, a blind, or non continuous short length groove 76 splits the chamfer into the two adjacent portions 72, 74.

The rib 66 has notches and each notch has a first side edge 101 extending from the circumferential groove 18 to a inner edge 102 and a second side edge 103 extending from the circumferential groove to the inner edge 102. The chamfer 70 is located in the notch having the edges 101, 102, and 103.

The first portion 72 of the chamfer 70 is inclined at a first angle, relative to the tread surface and the second, adjacent portion 74 is inclined at a second angle different from the first angle. Both portions 72, 74 are inclined at angles in the range of 10°-60° relative to the tread surface, and there is at least a 10° angle different between the inclination angles of the two portions 72, 74. The inclined portions 72, 74 terminate in end walls 78, the end walls 78 having a height h in the range of 0 to 50% of the groove depth D as measured from the base of the adjacent groove, see FIG. 4. If, as illustrated, the portion 72 having a lower inclination angle has a greater length than the adjacent portion, the end walls 78 may have almost identical heights h.

Figure 5:
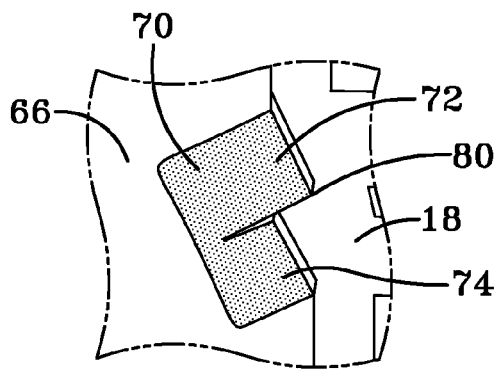
FIGS. 5-8 are different embodiments and views of the chamfer.
Figure 6:
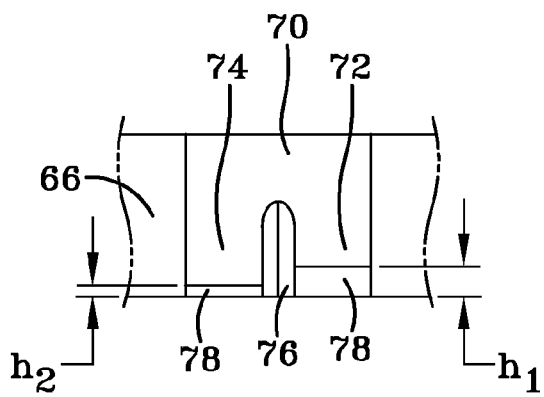
Figure 7:
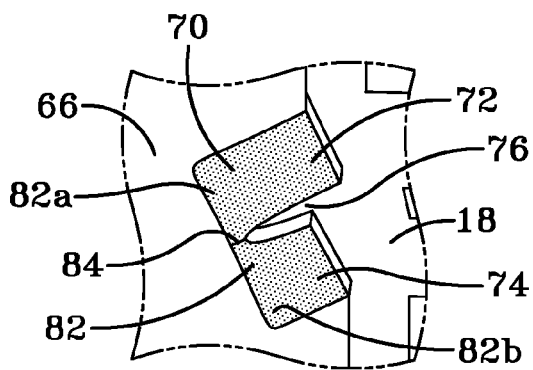

The adjacent split angle chamfer may be varied as shown in FIGS. 5 and 6. In the chamfer of FIG. 5, the adjacent portions 72, 74 of the chamfer 70 are separated by a sipe 80. The chamfer 70 need not even be split by a sipe 80, but may be simply divided wherein a radially extending wall connects the two adjacent portions 72, 74. In the chamfer of FIG. 7, as viewed parallel to the chamfer end walls 78, the end walls 78 have different heights h1, h2. In such a chamfer, the adjacent portions 72, 74 of the chamfer 70 may have equivalent lengths wherein the more steeply inclined portion has the smaller height end wall. Other minor variations in the chamfer may be made—such a providing more than two adjacent portions to the chamfer, and varying the lengths of each portion or the end wall heights of each portion.

Figure 8:
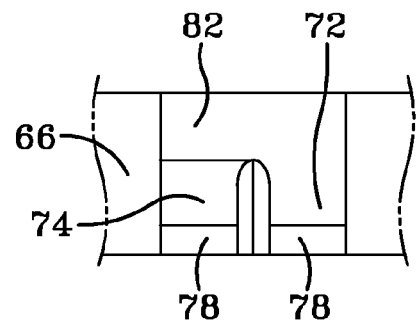

As the two adjacent portions 72, 74 of the chamfer have a common area 82 adjacent to the tread surface (the tread surface being determined when the tread is relatively unworn) to create the two different inclination angles of the portions, the common area 82 also has an inclination angle. The common area 82 may be divided in a line 84 parallel to the groove 76 such that the common area is also divided into two portions 82a, 82b, each portion having an inclination angle corresponding to the inclination angles of the two chamfer portions 72, 74, see FIG. 7. Alternatively, the entire common area 82 may have an inclination angle corresponding to the inclination angle of only one of the chamfer portions 72, 74, see FIG. 8. In another embodiment, not illustrated, the entire common area 82 may have an inclination angle different from the inclination angles of the two chamfer portions 72, 73—yielding a chamfer having three different angled portions.

While the chamfer 70 is illustrated in the context of one particular tread configuration, the chamfer 70 may be used as an element in other tread configurations and the use thereof in accordance with the present invention is not limited to the particular tread configuration illustrated.

What is claimed is:

1. A pneumatic tire, the tire comprising a tread,
the tread having a plurality of tread elements separated by at least one groove, the tread elements having a depth as determined from an initial tread surface and the base of the at least one groove,
at least one of the tread elements comprising at least one chamfer, the chamfer being located in a notch of the tread element wherein at the tread surface, the notch comprises an inner edge, a first side edge extending from the groove to the inner edge and a second side edge extending from the groove to the inner edge,
the chamfer comprising a common area and at least two adjacent portions, the common area having a surface extending from the inner edge of the notch toward the base of the groove and being inclined at an acute angle relative to the tread surface, each adjacent portion having a surface being connected to the surface of the common area and extending from the surface of the common area toward the base of the groove, the surfaces of the adjacent portions being inclined at different inclination angles relative to the tread surface, the difference in inclination angles being at least 10°, the adjacent portions being separated by a blind groove or blind sipe such that the difference in inclination angles of one edge of the blind groove or blind sipe and the other edge of the blind groove or blind sipe, respectively, is at least 10°, the notch having a first wall and a second wall such that the first wall of the notch extends radially inward from the first edge of the notch to the chamfer and the second wall of the notch extends radially inward from the second edge of the notch to the chamfer.

2. The tire of claim 1 wherein the surfaces of first and second inclined adjacent portions are inclined at angles in the range of 10° to 60° relative to the tread surface.

3. The tire of claim 1 wherein each of the first and second inclined adjacent portions of the chamfer have a radially extending end wall at a terminal end of each of the first and second inclined adjacent portions, the end walls having a height in the range of 0 to 50% of the groove depth.

4. The tire of claim 3 wherein the end walls of the first and second inclined adjacent portions of the chamfer have equivalent heights.

5. The tire of claim 3 wherein the end walls of the first and second inclined adjacent portions of the chamfer have different heights.

6. The tire of claim 1 wherein the at least two inclined adjacent portions are separated by a sipe.

7. The tire of claim 1 wherein the at least two inclined adjacent portions are separated by a groove.

8. The tire of claim 1 wherein the surface of the inclined common area has an inclination angle relative to the tread surface equivalent to the inclination angle of the surface of the at least one of the at least two inclined adjacent portions of the chamfer.

9. The tire of claim 1 wherein the surface of the inclined common area has an inclination angle relative to the tread surface different from the inclination angles of the surfaces of the at least two inclined adjacent portions of the chamfer.

* * * * *